(12) United States Patent
Dorion et al.

(10) Patent No.: US 7,421,786 B2
(45) Date of Patent: Sep. 9, 2008

(54) AVOCADO PITTER/SLICER

(75) Inventors: Christopher Dorion, Elmhurst, IL (US); Lacey Devereaux, Barrington, IL (US)

(73) Assignee: AMCO Houseworks LLC, Vernon Hills, IL (US)

( * ) Notice: Subject to any disclaimer, the term of this patent is extended or adjusted under 35 U.S.C. 154(b) by 351 days.

(21) Appl. No.: 11/254,956

(22) Filed: Oct. 20, 2005

(65) Prior Publication Data

US 2007/0089300 A1 Apr. 26, 2007

(51) Int. Cl.
*A47J 17/00* (2006.01)
*A47J 25/00* (2006.01)

(52) U.S. Cl. ............................. 30/114; 30/117; 30/302; 30/303

(58) Field of Classification Search ................ 30/113.1, 30/114, 117, 302, 303, 279.2, 280; 99/540, 99/541, 545; D7/673, 693
See application file for complete search history.

(56) References Cited

U.S. PATENT DOCUMENTS

| | | | | |
|---|---|---|---|---|
| 128,328 A * | 6/1872 | Schaefer | | 30/117 |
| 185,822 A | 1/1877 | Eveleth et al. | | |
| D23,872 S * | 12/1894 | Kellogg | | D30/159 |
| 921,917 A | 5/1909 | Troxell | | |
| 1,076,130 A * | 10/1913 | Lombardi | | 30/117 |
| 1,405,671 A * | 2/1922 | Crozier | | 30/117 |
| 1,436,236 A * | 11/1922 | Cartuschka | | 30/117 |
| 1,466,114 A | 8/1923 | Buchi | | |
| 1,565,846 A * | 12/1925 | Cantey | | 30/117 |
| 1,568,008 A | 12/1925 | Thomas | | |
| 1,607,009 A | 11/1926 | March | | |
| 1,653,578 A * | 12/1927 | Larsen | | 30/117 |
| 1,705,257 A * | 3/1929 | Lockett | | 30/117 |
| 1,714,495 A * | 5/1929 | Case | | 30/117 |
| 2,023,706 A * | 12/1935 | Smith | | 30/117 |
| D104,454 S * | 5/1937 | Koch | | 30/117 |
| 2,111,035 A * | 3/1938 | Winslow | | 30/117 |
| 2,114,277 A * | 4/1938 | Bloomfield | | 30/117 |
| 2,152,198 A * | 3/1939 | Lowenfels | | 30/117 |
| 2,188,020 A * | 1/1940 | Tewell | | 30/121.5 |
| 2,274,193 A * | 2/1942 | Evans | | 30/117 |
| 2,321,725 A * | 6/1943 | Alderfer | | 30/114 |
| 2,403,190 A * | 7/1946 | Parraga | | 30/117 |
| D149,622 S | 5/1948 | Dougherty | | |
| 2,505,917 A * | 5/1950 | Schumacher | | D7/693 |
| 2,509,190 A | 5/1950 | Langley | | |
| 2,550,166 A * | 4/1951 | Sargent et al. | | 30/117 |
| 2,589,911 A * | 3/1952 | Weinberg | | 30/117 |
| 2,679,688 A * | 6/1954 | Buschman | | 30/117 |
| 2,709,298 A * | 5/1955 | Mater | | 30/117 |
| 2,802,266 A * | 8/1957 | Huxhold | | 30/117 |
| 2,912,757 A | 11/1959 | Knight | | |
| 3,259,980 A | 7/1966 | Espino | | |
| 3,540,503 A | 11/1970 | McNair | | |

(Continued)

OTHER PUBLICATIONS

Williams-Sonoma®, Avocado Pitter/Slicer.*

*Primary Examiner*—Jason Prone
(74) *Attorney, Agent, or Firm*—Michael Best & Friedrich LLP

(57) ABSTRACT

An avocado slicer includes a frame having a proximal end and a distal end, and a plurality of slicing elements extending from the proximal end of the frame to the distal end of the frame. Each slicing element is substantially parallel to an adjacent slicing element.

22 Claims, 4 Drawing Sheets

U.S. PATENT DOCUMENTS

| | | |
|---|---|---|
| 4,007,676 A | 2/1977 | Ellis |
| 4,246,700 A | 1/1981 | Coulon et al. |
| 4,383,367 A | 5/1983 | Mielnicki |
| 4,557,053 A * | 12/1985 | Hadley, Jr. ............... 30/114 |
| 4,646,602 A * | 3/1987 | Bleick .................... 30/117 |
| 4,998,348 A * | 3/1991 | Foate ..................... 30/114 |
| 5,101,718 A | 4/1992 | Lin |
| 5,146,681 A | 9/1992 | Haghkar |
| 5,533,442 A | 7/1996 | Tateno |
| 5,613,431 A | 3/1997 | Tateno |
| 5,937,524 A * | 8/1999 | Hornsby ................ 30/113.1 |
| D450,981 S | 11/2001 | Kaposi |
| D453,450 S * | 2/2002 | Drummond ............... D7/693 |
| D464,851 S * | 10/2002 | Dorion .................... D7/673 |
| D488,360 S | 4/2004 | Young |
| D488,361 S | 4/2004 | Bertulis |
| 6,796,032 B2 * | 9/2004 | Horng .................... 30/114 |
| D507,726 S * | 7/2005 | Holcomb et al. ........... D7/693 |
| D515,884 S * | 2/2006 | Holcomb et al. ........... D7/693 |
| 7,055,247 B2 * | 6/2006 | Kaposi et al. ............. 30/114 |
| 7,080,454 B2 * | 7/2006 | Holcomb et al. ........... 30/114 |
| D528,379 S * | 9/2006 | Dorion et al. ............. D7/693 |
| 7,263,776 B1 * | 9/2007 | Shieh ..................... 99/545 |
| D559,636 S * | 1/2008 | Hauser et al. ............. D7/693 |

* cited by examiner

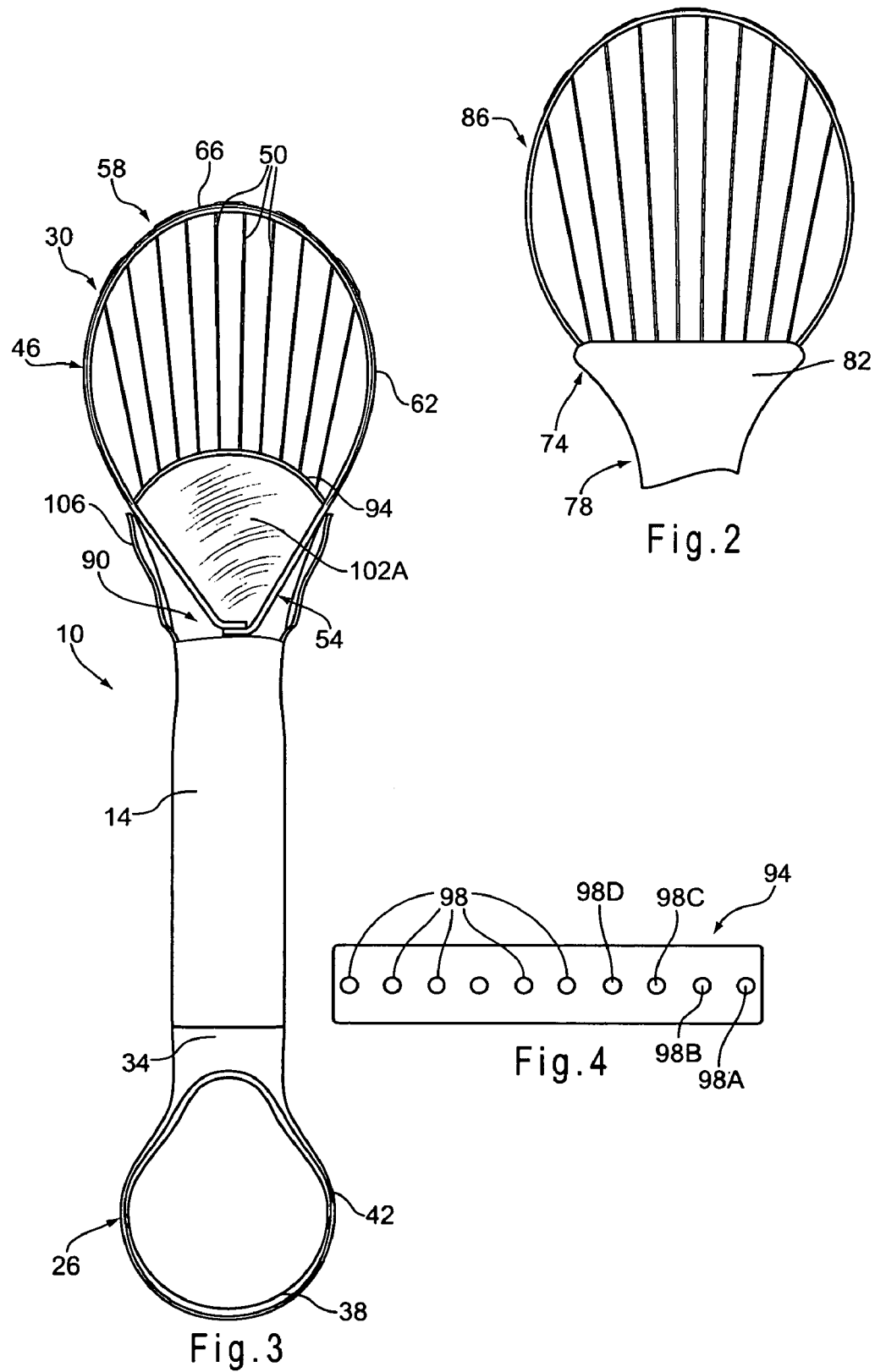

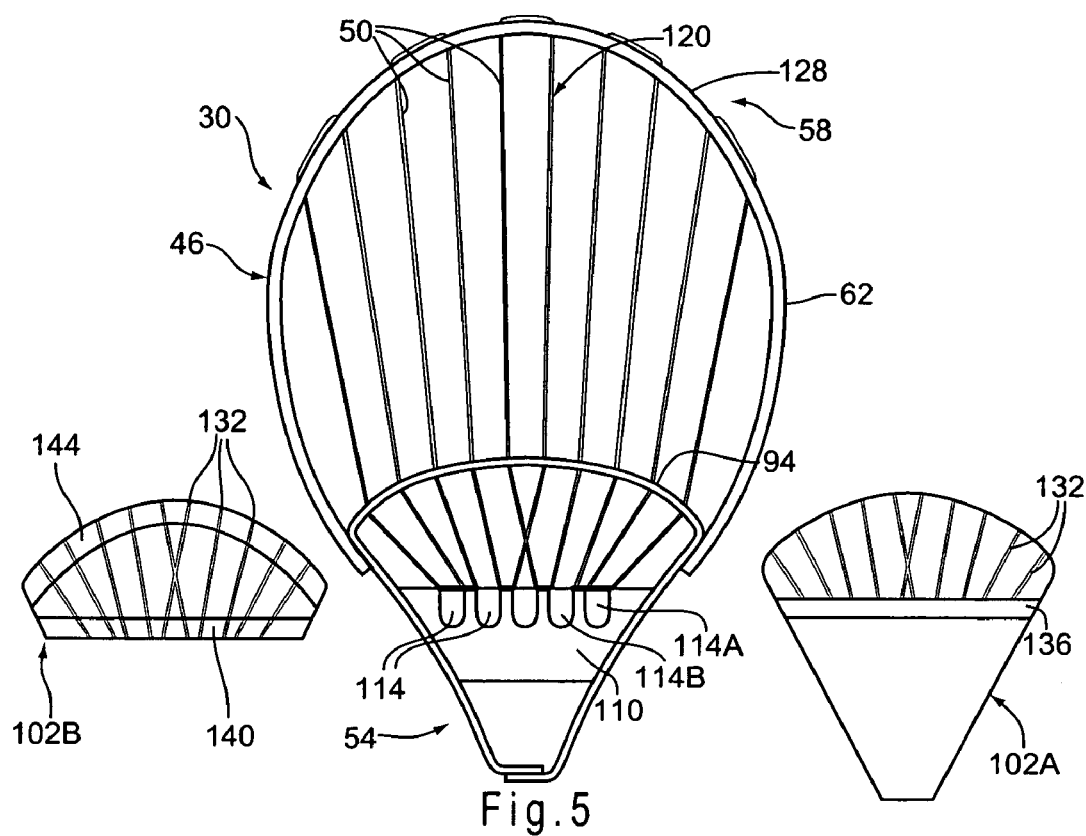
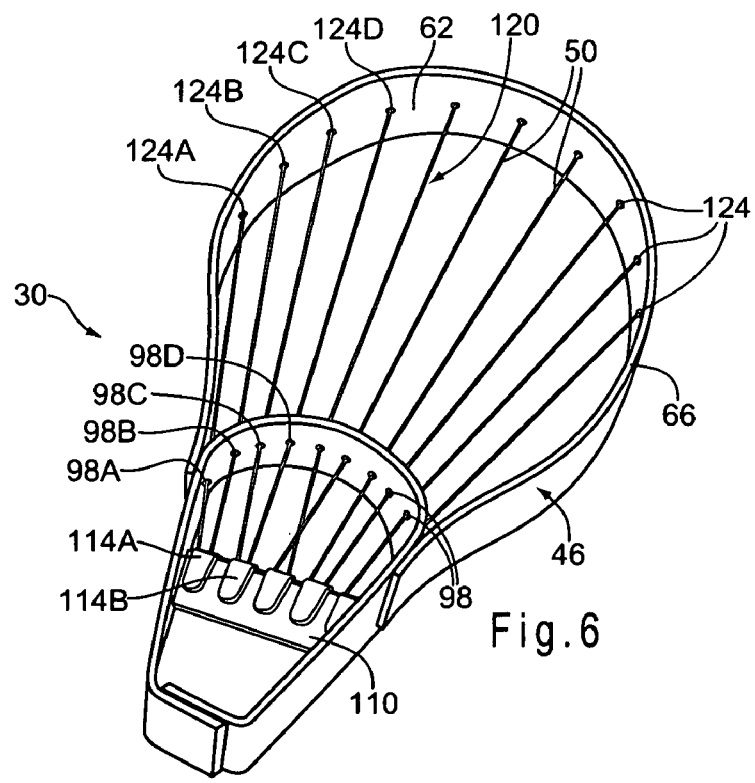

AVOCADO PITTER/SLICER

BACKGROUND

The present invention relates to a multi-purpose tool for preparing an avocado, and in particular, the pitting, peeling and slicing of an avocado.

Preparation of avocadoes for consumption can be a messy endeavor. Typically, the avocado skin is removed, leaving the fleshy fruit exposed to handling, the avocado pit is removed, and the fruit is sliced for preparation and/or consumption. Often the excessive and firm handling of the fruit during this process leaves the fruit in a pulpy mess, making the avocado appear unappetizing. One tool currently used in avocado preparation includes a handle with a fan-like slicer attached to one end of the handle. The slicer includes a C-shaped frame with slicing wires anchored at a single anchor point at one end of the frame. Each slicing wire extends radially outward from the anchor point to a point along the frame to form a fan-like appearance. Adjacent the anchor point, where the slicing wires converge, very tight and close spaces are formed between the wires. During slicing, avocado residue, such as the fruit fiber, may become trapped in the spaces and tangled around the wires near the anchor point. Cleaning the fiber out of these spaces can be difficult since cleaning devices may be too large to get in between the converging wires to remove the fibrous fruit.

SUMMARY

In one embodiment, the invention provides an avocado slicer including a frame having a proximal end and a distal end, and a plurality of slicing elements extending from the proximal end of the frame to the distal end of the frame. Each slicing element is substantially parallel to an adjacent slicing element.

In another embodiment, the invention provides a tool for preparing an avocado that includes a handle having a first end and a second end, a scoop coupled to the first end of the handle, and a slicer extending from the second end of the handle. The scoop is configured and adapted for removing a pit of the avocado. The slicer includes a frame having a proximal end and a distal end, and a plurality of slicing elements extending from the proximal end of the frame to the distal end of the frame.

In yet another embodiment, the invention provides a tool for preparing an avocado that includes a handle having a first end and a second end, a scoop coupled to the first end of the handle, and a slicer extending from the second end of the handle. The scoop is configured and adapted for removing a pit of the avocado. The slicer includes a frame having a proximal end and a distal end, wherein a portion of the proximal end of the frame is positioned within a chamber defined in the handle. A plurality of slicing elements extend from the proximal end of the frame to the distal end of the frame, and each slicing element is substantially parallel to an adjacent slicing element. An anchor point is positioned at the proximal end of the frame, wherein the slicing elements extend from the anchor point to the distal end of the frame.

Other aspects of the invention will become apparent by consideration of the detailed description and accompanying drawings.

DESCRIPTION OF THE DRAWINGS

FIG. 2 is a plan view of another embodiment of a slicer for the avocado pitter/slicer.

FIG. 3 is top plan view of the avocado pitter/slicer shown in FIG. 1 with a portion of the tool handle removed to reveal a chamber within the handle.

FIG. 4 is an end view of a closing member for the slicer and the tool handle.

FIG. 5 is an exploded plan view of the slicer for the avocado/pitter slicer shown in FIG. 1, including a continuous wire forming the slicing elements.

FIG. 6 is a perspective view of the slicer shown in FIG. 5.

Figure 1:
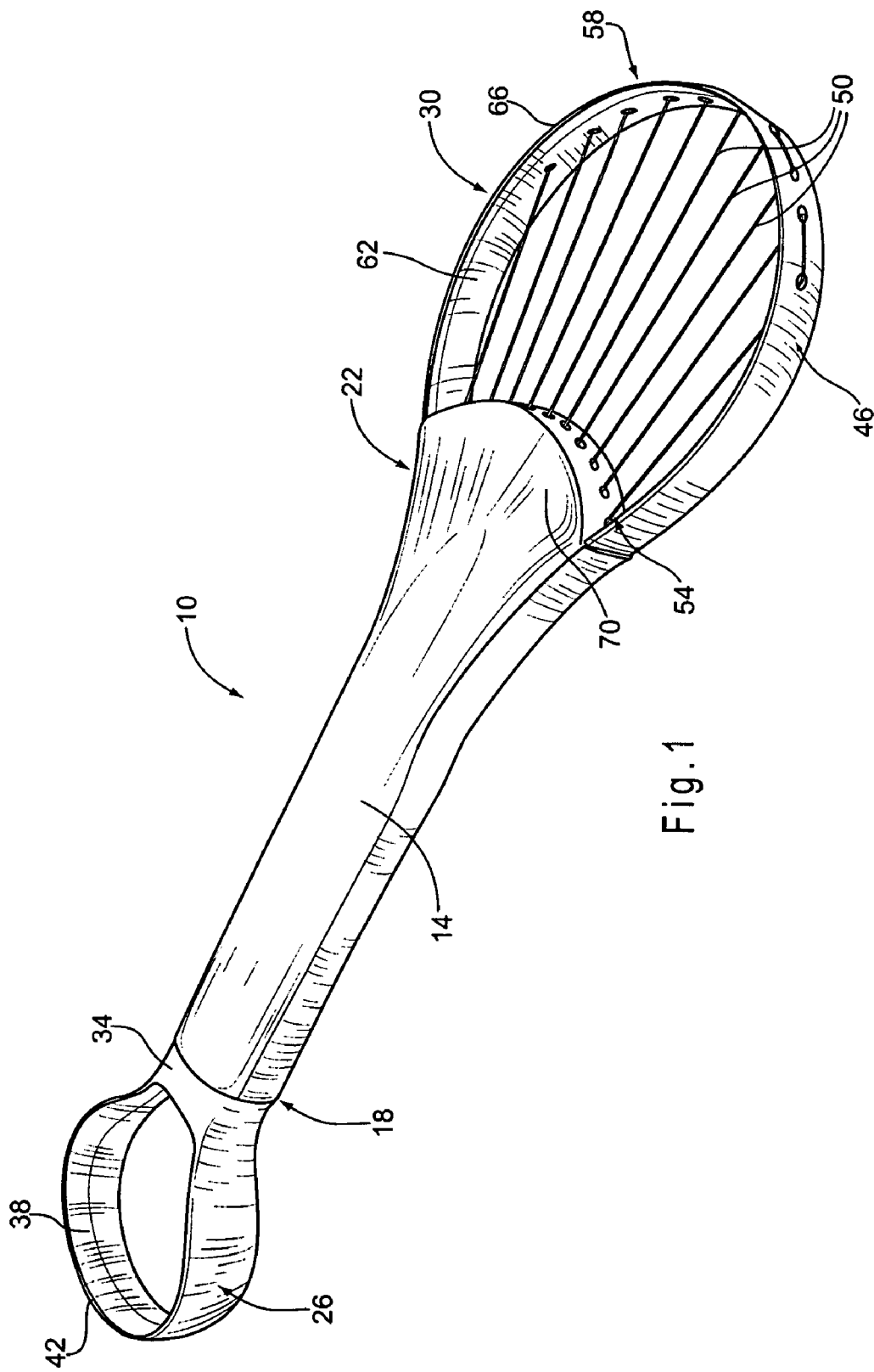
FIG. 1 is a perspective view of one embodiment of an avocado pitter/slicer tool.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and may not be regarded as limiting.

DETAILED DESCRIPTION

FIG. 1 illustrates an avocado pitter/slicer tool 10 for preparing an avocado for serving. In use, the avocado is sliced in half and an avocado pit is scooped from the center of the fruit. The skin is then removed simultaneously while slicing the fruit into thin wedges for serving or for further preparation of the fruit. The tool 10 includes a handle 14 having a first end 18 and a second end 22. In the illustrated embodiment, the handle 14 is formed from stainless steel.

A scoop 26, or pitter, is coupled to the first end 18 of the handle 14 and a slicer 30 is coupled to the second end 22 of the handle 14. The scoop 26 is configured and adapted for removing a pit from an avocado without mangling the fruit during removal. The scoop 26 includes an attachment portion 34 coupled to the handle 14 and a generally pear shaped loop 38 axially extending from the attachment portion 34. In the illustrated embodiment, the scoop 26 attaches to the first end 18 of the handle 14, however, in another embodiment, the scoop 26 may be integral with the handle 14 forming a unitary tool. The loop 38 includes at least one relatively sharp, tapered edge 42 for facilitating removal of the avocado pit from the fruit. In the illustrated embodiment, the scoop 26 is formed from a nylon material that inserts into the handle 14 and is secured thereto by screws, rivets, adhesive, or the like.

The avocado slicer 30 of the tool 10 includes a frame 46 and slicing elements 50 extending from a proximal end 54 of the frame 46 to a distal end 58 of the frame 46. The frame 46 of the slicer 30 is used to peel the skin from the avocado while the slicing elements 50 simultaneously slice the fruit. In the illustrated embodiment, the frame 46 is formed by a band 62 having a generally oval shape such that the frame 46 takes the form of the fruit, i.e., an avocado. At least one edge of the band 62 is beveled or tapered to create a sharpened edge 66 to facilitate peeling of the skin from the fruit. The sharpened edge 66 and the overall shape of the frame 46 facilitates positioning and movement of the frame 46 between the peel, or skin, and the fruit of the avocado, thus cutting the fibrous matter that holds the peel to the fruit. The frame 46 can be formed from stainless steel, hardened plastic or the like.

The second end 22 of the handle 14 forms a base 70 for the slicer 30 and has a fan-shape as illustrated in FIG. 1. FIG. 2 illustrates another embodiment of a handle, wherein an end 74 of a handle 78 includes a flat shape that forms a base 82 of a slicer 86. Referring to FIG. 1, the fan-shaped base 70 of the slicer 30 is a unitary part of the handle. In another embodiment of the pitter/slicer tool 10, the second end 22 of the handle 14 is formed separately from the handle 14 and is attached to the handle 14 using fastener means, such as nuts, bolts or screws, and the like.

FIG. 3 illustrates the tool 10 and the slicer 30 at the second end 22 of the handle 14 with a portion of the handle 14 removed. The second end 22 of the handle 14 defines a chamber 90 for receiving a portion of the proximal end 54 of the frame 46 therein. A closing member 94, shown in FIGS. 3 and 4 and which forms part of the base 70 of the slicer 30, encloses the chamber 90. The closing member 94 includes passages 98 for permitting the slicing elements 50 to pass therethrough and allowing access to the chamber 90. Each passage 98 permits entry of one end of the slicing elements 50.

In the illustrated embodiment, a pair of nylon, or plastic, inserts 102A, 102B are positioned within the chamber 90 adjacent the closing member 94 for fluidly sealing the chamber 90 and for anchoring the slicing elements 50. In another embodiment, the chamber 90 in the handle 14 and other hollow portions of the handle 14 are filled with an epoxy filler to provide ruggedness to the handle 14 so that the handle wall 106 does not collapse in use. Further, the chamber 90 may also include a polymer to provide further anchoring of the slicing elements 50. In yet another embodiment, the passages 98 in the closing member 94 are sealed with the same type of materials that fill the chamber 90 and other areas of the handle 14 to further secure the slicing elements 50 and to prevent water and fruit residue from becoming trapped in the passages 98. Filling of the chamber 90 and the passages 98 with such materials as a polymer, a nylon insert, a plastic insert, or the like may prevent water from entering the chamber 90 of the tool handle 14 during cleaning. It should be readily apparent to those of skill in the art that other materials may be used to form the inserts and provide a seal.

In another embodiment of the pitter/slicer tool 10, the frame 46 is attached to an outer surface of the handle 14 by fastening means, such as screws, other fasteners, adhesive, or the like. In still another embodiment, the handle 14 and the frame 46 are of a unitary construction forming one continuous unit.

FIG. 5 illustrates an exploded view of the slicer 30, the inserts 102A, 102B, and FIG. 6 is a perspective view of the slicer 30 with the inserts 102A, 102B removed. The slicing elements 50 extend from the proximal end 54 of the frame 46 to the distal end 58 of the frame 46. Referring to FIGS. 5 and 6, the slicer 30 includes an anchor plate 110 positioned at the proximal end 54 of the frame 46 and mounted between opposite sides of the frame 46. The anchor plate 110 includes five anchor tabs 114, each anchor tab 114 being substantially U-shaped, with one end that extends from the anchor plate 110 and a free end are folded over back onto the plate 110.

The slicing elements 50 are formed from a continuous wire 120. The wire 120 is strung back and forth across the frame 46, between the proximal end 54 and the distal end 58, to form the slicing elements 50 in a preferred slicing pattern. The wire 120 is attached to an outer anchor tab 114A and is drawn from the anchor tab 114A through a second passage 98B in the closing member 94, or the base 70 of the handle 14. The wire 120 stretches across the frame 46 through a second hole 124B at the distal end 58 of the frame 46. The wire 120 continues along an outer surface 128 of the frame 46 to an adjacent, first hole 124A and the wire 120 enters the hole 124A. The wire 120 stretches back across the frame 46 in an opposite direction, enters the chamber 90 through a first passage 98A adjacent the second passage 98B. The wire 120 is wrapped around the first anchor tab 114A and then continues across the top surface of plate 110 to an adjacent anchor tab 114B within the chamber 90. The wire wraps around the anchor tab 114B and extends through a fourth passage 98D in the closing member 94 adjacent a third passage 98C. The wire 120 continues along an outer surface 128 of the frame 46 to the adjacent, third hole 124C and the wire 120 enters the hole 124C. The wire 120 stretches back across the frame 46 in an opposite direction, enters the chamber 90 through the third passage 98C between the second and fourth passages 98B, 98D. The wire 120 stretches across the frame 46 to a fourth hole 124D in the distal end 58 of the frame 46 adjacent a third hole 124C. The wire 120 is continually strung across the frame 46 in this manner until the desired number of slicing elements 50 extend taut across the frame 46.

It should be readily apparent to those of skill in the art that other patterns for stringing about the anchor tabs 114 may be used. In a further embodiment, the slicing elements 50 are formed by a series of individual wires that extend from an anchor point, through a first passage, through the frame and back across the frame to the same or adjacent anchor point, similar to the method described above. Each wire forms two, adjacent slicing elements 50.

The slicing elements 50 are generally evenly spaced apart from one another such that each slicing element 50 is substantially parallel to an adjacent slicing element 50. The passages 98 of the closing member 94 and the holes 124 in the frame 46 are spaced from one another to facilitate even spacing of the slicing elements 50. Even spacing of the slicing elements 50 prevents build up of fruit residue and fiber at the proximal end 54 of the slicer 30 and improves the ability to fully clean the slicer 30. In the illustrated embodiment, spacing of the passages 98 in the closing member 94 and between slicing elements 50 at the proximal end 54 of the slicer 30 is between about 0.0625 inches and about 0.1875 inches. Spacing of the holes 124 in the frame 46 and between slicing elements 50 at the distal end 58 of the slicer 30 is about 0.1875 inches and about 0.3125 inches.

The insert 102A is generally pie-shaped and fits within the portion of the frame 46 that is positioned within the chamber 90. The insert 102B is generally arched shaped, which permits room for the anchor tabs 114, and fits within the frame 46 between the closing member 94 and the anchor plate 110. The inserts 102A, 102B sandwich the slicing elements and anchor the slicing elements within the chamber 90. Each of the inserts 102A, 102B includes recessed element paths 132 for receiving the slicing elements 50, and the elements paths 132 mirror the pattern of the slicing elements 50. The insert 102A includes a recessed area 136 and the insert 102B includes a raised area 140 corresponding to the recessed area 136 of the insert 102A. The raised area 140 of the insert 102B is received by the recessed area 136 of the insert 102A to further secure the slicing elements 50 and keep the elements 50 taut. The insert 102B includes an outer portion 144 formed of soft, sealant material that receives the slicing elements 50 and seals the passages 98 in the closing member 94.

Figure 7:
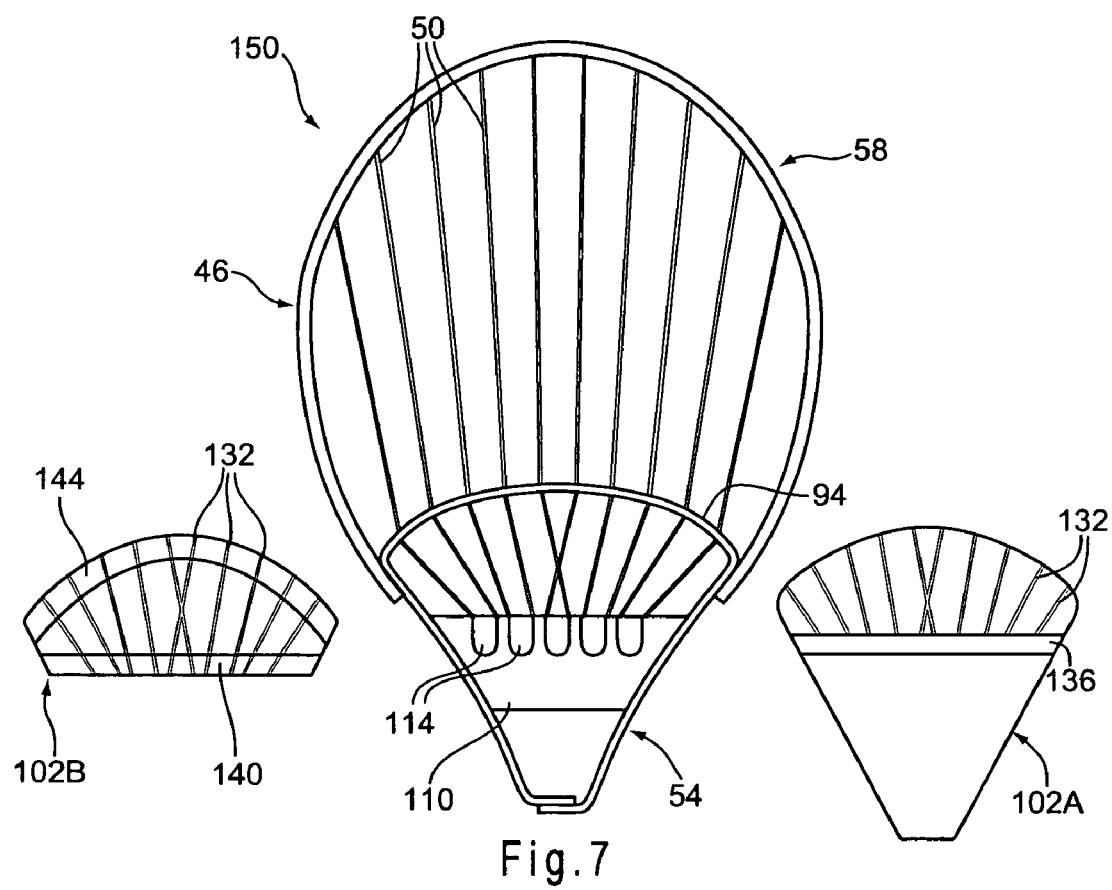
FIG. 7 is an exploded plan view of another embodiment of a slicer for the avocado pitter/slicer.

FIG. 7 illustrates another embodiment of a slicer of the pitter/slicer tool 10. In FIG. 7, similar features of the slicer 30 shown in FIGS. 1-6 are identified by similar reference numbers. A slicer 150 includes the frame 46 and the slicing elements 50 formed by individual wires. One end of each slicing element 50 is coupled to one of the anchor tabs 114, and passes through the inserts 102A, 102B and the passages 98 (FIG. 4) of the closing member 94. An opposite end of each slicing element 50 terminates at the distal end 58 of the frame 46 and is coupled to the frame 46. For example, the slicing element 50 may be affixed to the distal end 58 of the frame 46 by an adhesive, coupled to an outer or inner portion of the distal end 58 of the frame 46 by a fastener, or pass through a passage (not shown) in the frame 46 and tied off to maintain a taut slicing element 50. In a further embodiment, the slicing elements 50 may extend from holes, slots or other passages that are present in the second end 22 of the handle 14.

In the illustrated embodiments, the slicing elements 50 are formed from stainless steel wire, however, those of skill in the art will recognize that other materials may be used for the wire, such as plastic or nylon. The wire has shearing and tensile strength sufficient to pass through an avocado. In a further embodiment, the slicing elements 50 are formed by a narrow, stainless steel ribbon that stretches across the frame 46. In the illustrated embodiment, ten slicing elements 50 are shown, although in other embodiments fewer or more slicing elements 50 may be used. Preferably, there are 6 to 16 slicing elements 50 in the slicer 30 and more preferably there are 8 to 12 slicing elements 50.

In use, an avocado is first cut in half with a knife or other sharp implement. The pit typically remains attached to one of the separated avocado halves. The scoop 26 is positioned about the pit and the sharpened edge 42 of the scoop 26 is positioned between the pit and the fruit, such that the sharpened edge 42 cuts the fibrous material holding the pit to the fruit, thereby allowing easy separation of the pit from the avocado half. To slice the avocado, the sharpened edge 66 of the slicer is positioned between the avocado peel and the fruit. The slicer is pulled in an arc along the peel such that the fruit portion of the avocado is sliced by the slicing elements 50 and the peel is cut away from the fruit by the sharpened edge 66 of the frame 46. The sliced fruit is pulled out of the peel by slicing elements 50 and the peel falls away.

Various features and advantages of the invention are set forth in the following claims.

What is claimed is:

1. An avocado slicer comprising:
    a frame including a proximal end and a distal end, the proximal end of the frame including a plurality of proximal holes and the distal end of the frame including a plurality of distal holes;
    a plurality of slicing elements extending from the proximal end of the frame to the distal end of the frame, each of said slicing elements extending from one of the plurality of proximal holes to one of the plurality of distal holes such that each of the slicing elements is substantially parallel to adjacent ones of said slicing elements; and
    an anchor plate at the proximal end of the frame and positioned within the frame, wherein one end of each slicing element is coupled to the anchor plate.

2. The avocado slicer of claim 1, and further comprising a handle, wherein the proximal end of the frame is coupled to the handle.

3. The avocado slicer of claim 1 wherein the frame includes a band.

4. The avocado slicer of claim 3 wherein at least one edge of the band is tapered to create a sharpened edge.

5. The avocado slicer of claim 1 wherein the slicing elements are formed by wire.

6. The avocado slicer of claim 5 wherein the wire is a continuous wire strung back and forth across the frame.

7. The avocado slicer of claim 1 wherein the slicing elements are formed by a narrow ribbon.

8. The avocado slicer of claim 1 wherein the slicing elements are formed from plastic.

9. The avocado slicer of claim 1 wherein the slicing elements are formed from stainless steel.

10. The avocado slicer of claim 1 wherein the plurality of slicing elements includes ten slicing elements.

11. The avocado slicer of claim 1 wherein the anchor plate includes a plurality of anchor tabs and one end of each slicing element is coupled to one of the anchor tabs.

12. A tool for preparing an avocado, the tool comprising:
    a handle having a first end and a second end;
    a scoop coupled to the first end of the handle, the scoop configured and adapted for removing a pit of the avocado;
    a slicer extending from the second end of the handle, the slicer including,
        a frame including a proximal end and a distal end, and
        a plurality of slicing elements extending from the proximal end of the frame to the distal end of the frame;
    wherein the proximal end of the frame is positioned within a chamber defined in the handle;
    a closing member at the second end of the handle to close the chamber, wherein a plurality of passages are formed in the closing member through which the slicing elements pass; and
    an anchor plate positioned within the proximal end of the frame, wherein each slicing element is coupled to the anchor plate.

13. The tool of claim 12, and further comprising an insert positioned within the chamber to fluidly seal the handle.

14. The tool of claim 12, and further comprising an insert positioned within the chamber to hold the slicing elements in position.

15. The tool of claim 12 wherein at least one edge of the scoop is sharpened to facilitate removal of the avocado pit.

16. The tool of claim 12 wherein each of said slicing elements is substantially parallel to adjacent ones of said slicing elements.

17. The tool of claim 12, wherein the anchor plate includes a plurality of anchor tabs, and wherein each slicing element is coupled to one of the anchor tabs.

18. A tool for preparing an avocado, the tool comprising:
    a handle having a first end and a second end;
    a scoop coupled to the first end of the handle, the scoop configured and adapted for removing a pit of the avocado;
    a slicer extending from the second end of the handle, the slicer including,
        a frame including a proximal end and a distal end, wherein a portion of the proximal end of the frame is positioned within a chamber defined in the handle, and
        a plurality of slicing elements extending from the proximal end of the frame to the distal end of the frame, each of said slicing elements is substantially parallel to adjacent ones of said slicing elements; and
        an anchor plate positioned within the chamber and mounted within the proximal end of the frame, wherein the slicing elements extend from the anchor plate to the distal end of the frame.

19. The tool of claim 18 wherein the anchor plate includes a plurality of anchor tabs and each slicing element is coupled to one of the anchor tabs.

20. The tool of claim 18, and further comprising a closing member at the second end of the handle to close the chamber, wherein a plurality of passages are formed in the closing member through which the slicing elements pass.

21. The tool of claim 20, and further comprising an insert positioned within the chamber to fluidly seal the handle.

22. The tool of claim 20, and further comprising an insert positioned within the chamber to hold the slicing elements in position.

* * * * *